United States Patent Office 2,756,126
Patented July 24, 1956

2,756,126

PROCESS FOR PRODUCING ZIRCONIUM CARBIDE

Robert A. Schoenlaub, Cleveland, Ohio, assignor, by mesne assignments, to Zirconium Corporation of America, Cleveland, Ohio, a corporation of Ohio No Drawing. Application September 29, 1951, Serial No. 249,009

1 Claim. (Cl. 23—16)

This invention relates to a process of obtaining zirconium carbide which is useful as such and particularly as an intermediate suitable for the manufacture of chemicals.

Previously zirconium chemicals have been obtained by two general methods. The oldest method, originally developed by Berzelius about 1820, comprises the fusion of zircon, etc. with fluxes. Such fluxes as potassium hydrogen fluoride, caustic alkalies, alkali carbonates, alkali acid sulfates have been used, usually in considerable excess. The fused matter is usually digested or leached with acid to obtain zirconium in the form of a dissolved salt. The dissolved salt is then purified in many ways such as by precipitation and redigestion. This usually produces the hydroxide, or basic salts. If the normal halogen salts are desired, it is necessary to form the oxide and react it with the halogen in the absence of water. This general method requires so much labor, processing and so many chemicals that it is rarely used at present.

The second method seems to have been used first by Troost about 1893. It comprises in its essentials the heating of zirconium raw materials to very high temperatures in electric furnaces. At these temperatures the impurities volatilize out, leaving zirconium oxide and the hafnium oxide with which it may be associated. Modern practices use carbon, or carbon and iron additions and may produce oxides, or carbides, but they are essentially similar. The product so obtained, usually the carbide is then reacted directly to give the desired chemical. This general method depending upon high temperature volatilization of such refractory substances of silica, consumes such large amounts of power that it is expensive and more or less inoperable in certain regions and times of power shortages. Also, the furnacing is essentially a batch process and considerable labor is involved.

The objects of the present invention are, (1) the production of a high quality reactive zirconium compound as an intermediate for zirconium chemicals, metal and miscellaneous products, and (2) the reduction of power consumption to a small fraction of that previously required and the reduction of equipment and labor. Other objects and advantages will become apparent as the description proceeds.

To the accomplishment of the foregoing and related ends, said invention then comprises the features hereinafter fully described and particularly pointed out in the claim, the following description setting forth in detail certain embodiments of the invention, these being indicative, however, of but a few of the various ways in which the principle of the invention may be employed.

My invention comprises the reaction of calcium and zirconia containing materials with carbon to form calcium carbide and zirconium carbide. The immediate reaction product is then treated to form calcium hydroxide, acetylene and such reaction products then removed to leave a residue of pure zirconium carbide.

By the term "stabilized zirconia" as used in the following description and in the appended claims I intend $ZrO_2$ which contains from about 4% to about 8% of CaO in solid solution. It has a cubic system in spherical grains, rarely showing faces; no cleavage; an index of refraction of 2.12 (8% CaO) to 2.14 (4% CaO); and a density of about 5.2. Processes for the production of stabilized zirconia are given in my co-pending applications, Serial No. 650,057, filed March 25, 1946, and Serial No. 247,359, filed September 19, 1951, now Patent No. 2,721,115.

Calcium zirconate is a definite product, having the formula $CaO \cdot ZrO_2$. It contains about 31.5% CaO and about 68.5% $ZrO_2$. Its crystal system is orthorhombic, 100, 010, 001, 111 faces; cleavage, index of refraction 2.02, 2.15, 2.05, density about 5.7. A process for the economical production of calcium zirconate is given in my co-pending application, Serial No. 249,010, filed September 29, 1951, now Patent No. 2,721,117.

This process is applicable to solid solutions of calcium oxide in zirconium oxide such as stabilized zirconia or compounds between calcium oxide and zirconium oxide such as calcium zirconate or physical mixtures of zirconium oxide and calcium oxide in any form. These several materials will for convenience be collectively referred to hereinafter and in the claims as calcium-zirconates. While it is the intention in this invention to utilize calcium-zirconates, other oxides or compounds cannot be excluded from commercial reactions. In general oxides or compounds which will form carbides which do not decompose on the addition of water will contaminate the product and steps should be taken definitely to exclude such from the reaction mass. In particular, silica and titanium should be excluded. Compounds or elements which form carbides which decompose on contact with water are less deleterious and accordingly minor amounts of such, if present in the raw materials, can be tolerated.

Any convenient form of carbon may be used in the reaction. Metallurgical coke such as is available from the petroleum industry is quite satisfactory.

The equipment used in the process is conventional.

The time and temperature required in carbide reactions cannot be closely defined. Usually carbide reactions of this type are accomplished in electric resistance furnaces in which there is no way of determining the precise temperatures. Temperatures to create zirconium carbide are considered to be those in excess of 3600° F. Below 3600° F. zirconium oxide is not positively reduced to the carbide. There seems to be no upper limit to the temperatures that can be used beyond that fixed by the volatilization of the zirconium, the temperature of which is not known. Usually in forming zirconium carbide, a temperature of about 4000° F. is attained and maintained long enough to volatilize out associated materials. This holding period is usually about 36 hours. In the practice of the present invention, this is not necessary. It is necessary merely to attain a temperature above 3600° F. and preferably about 4000° F. and hold it only until the temperature has become equalized within the furnace charge and the reaction completed. This usually occurs in a matter of seven or eight hours.

The calcium and zirconium containing material such as calcium zirconate or stabilized zirconia is mixed with the theoretical amounts of carbon, plus a suitable excess. For calcium zirconate, I usually use about 50 parts of carbon for each 100 parts of the zirconate and for stabilized zirconia about 10 parts of carbon per 100 parts of zirconia. The mass is then heated to a temperature of 3600–4000° F. until reaction is complete. Any convenient arc or resistance furnace of the type used in making silicon carbide, calcium carbide, etc. may be used. The ingot is allowed to cool and is then crushed.

The amount of crushing necessary varies considerably.

Usually crushing to —¼" is adequate although some carbides seem to work better at a smaller size. I then react the carbides with water, preferably hot water, until reaction is complete. Acetylene may be collected at this step. I then classify and wash the residual solids in any convenient machine such as a rake, or spiral classifier. If very low CaO content in the end product is desired, it is advantageous to wash further with acidulated water. This procedure produces a milk of lime, acetylene and a zirconium carbide for future processing.

The carbide can be oxidized to produce a very pure monoclinic and fine grained zirconia for enamels, abrasives, etc. Or it can be reacted at moderate temperatures with halogens to produce the normal chlorides, iodides, bromides or fluorides. Or it can be reacted with various acids to produce the basic salts. Products obtained by this method are intrinsically pure except for small amounts of hafnia.

With suitable equipment, the zirconium carbide can be produced for an expenditure of about 3 kwh. per pound of contained zirconium. If zirconium silicate is the starting material and when utilizing the processes of the prior art, about 27 kwh. are required for each pound of contained zirconium. The difference is due to the latent heat of volatilization of silica and the radiation losses, attendant to holding a high temperature for the attainment of low residual silica. Also, considerable zirconium is lost along with the silica which increases the power required per unit of final product.

The separation of the carbides by the present process is not an obvious thing. Carbides are intrinsically impure, forming all kinds of double carbides, solid solutions and nitrocarbides, etc. Since zirconium oxide forms both an intermediate compound (the zirconate) and extensive solid solution (stabilized zirconia) with CaO, it would be expected that the carbides would also form intermediate compounds and solid solution. That calcium carbide and zirconium carbide can form in the same system is entirely unpredictable and unexpected.

As an example of my invention, I cite the following:

To 100 parts of calcium zirconate containing 28% CaO, I mix 50 parts of petroleum coke. The mixture is —50 mesh. I then heat this in a resistor furnace to a temperature of about 4000° F. for 1 hour. The product so obtained contained 3.78% Ca. This product was crushed to —10 mesh and reacted with hot water, and the residue separated from the reaction products by washing and finally leeching with dilute acid. I obtain a zirconium carbide product containing no iron, alumina or titania and only .2% Ca.

Other modes of applying the principle of the invention may be employed, change being made as regards the details described, provided the features stated in any of the following claims or the equivalent of such be employed.

I, therefore, particularly point out and distinctly claim as my invention:

The process for producing zirconium carbide which comprises: (a) mixing at least one calcium and zirconium-containing material selected from the group consisting of: (I) calcium zirconate, (II) solid solutions of calcium oxide and zirconium oxide, and (III) mixtures of zirconium oxide and calcium oxide, with carbon in an amount slightly in excess of that theoretically required to form carbides of the remainder of the mixture, (b) heating such admixture to a temperature of about 4000° F. for about 1 hour, to form a reaction mass, (c) cooling and crushing the reaction mass to a fineness of about —10 mesh, (d) reacting and washing the finely-divided reaction mass with hot water and then (e) leaching the residue from said last-named step with acid to produce a final residue which is substantially pure zirconium carbide.

References Cited in the file of this patent

UNITED STATES PATENTS

| | | |
|---|---|---|
| 1,576,275 | Hartmann | Mar. 9, 1926 |
| 2,205,386 | Balke et al. | June 25, 1940 |
| 2,578,748 | Schoenlaub | Dec. 18, 1951 |

OTHER REFERENCES

Mellor: "Treatise on Inorganic and Theoretical Chemistry" (1924), vol. 5, page 885.